E. L. NEWMAN.
CRUDE OIL BURNER.
APPLICATION FILED FEB. 23, 1909.
940,713.
Patented Nov. 23, 1909.
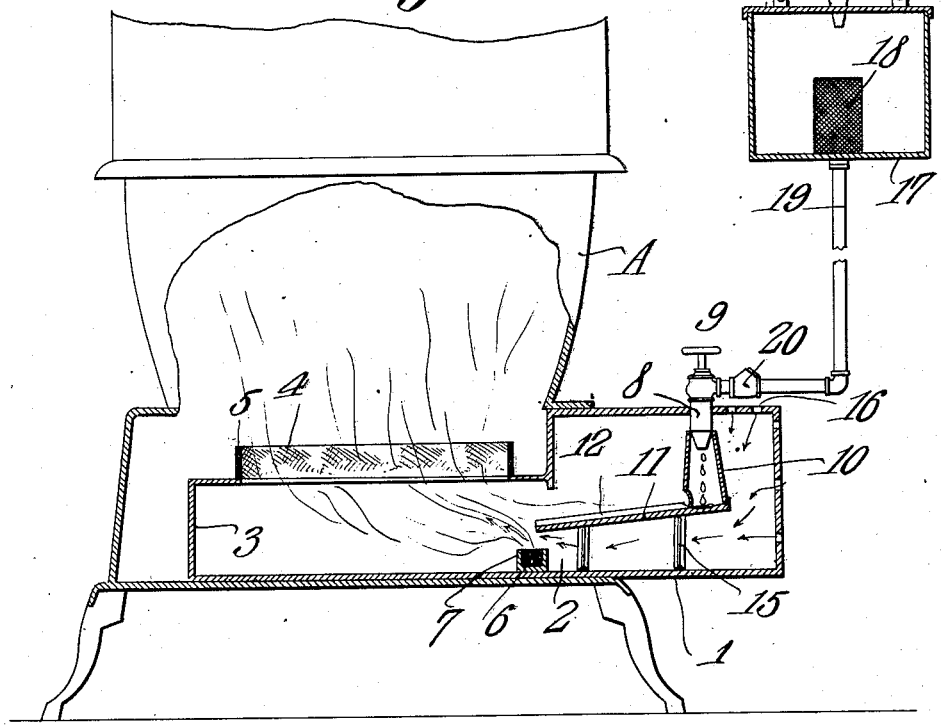
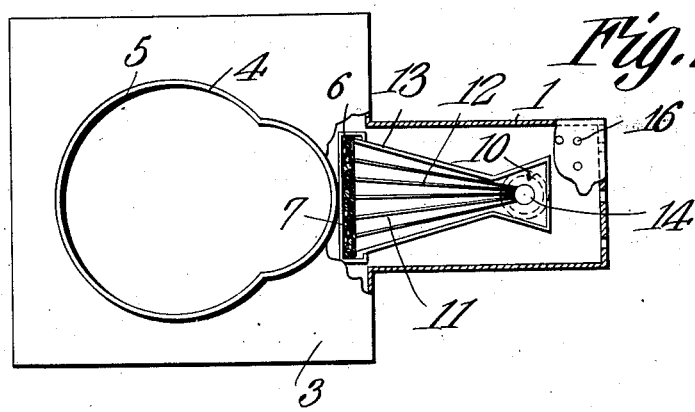
Witnesses
Inventor
Ernest L. Newman
By C. A. Snow & Co.
Attorneys

UNITED STATES PATENT OFFICE.

ERNEST L. NEWMAN, OF PARSONS, KANSAS, ASSIGNOR, BY MESNE ASSIGNMENTS, OF ONE-HALF TO H. P. FRANKEBERGER.

CRUDE-OIL BURNER.

940,713. Specification of Letters Patent. Patented Nov. 23, 1909.

Application filed February 23, 1909. Serial No. 479,309.

*To all whom it may concern:*

Be it known that I, ERNEST L. NEWMAN, a citizen of the United States, residing at Parsons, in the county of Labetta and State of Kansas, have invented a new and useful Crude-Oil Burner, of which the following is a specification.

This invention relates to burners for use in connection with heating and cooking stoves of different constructions, the burner being of that type designed for using crude oil as a fuel.

The object of the invention is to provide a simple and inexpensive form of burner having novel means whereby the crude oil may be spread over a broad surface and vaporized, means being utilized for catching any surplus oil discharged from the spreading means and holding it at a point where it will be completely consumed.

A further object is to provide simple means for supplying air to the vapor in sufficient quantities to cause perfect combustion, and therefore the elimination of soot and other objectionable deposits.

A further object is to provide a heater the parts of which can be readily separated for cleaning purposes, said heater being insertible into the ash-pits of stoves of different forms, and thus permitting oil to be used as a substitute for coal, wood, and similar fuels.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a view partly in section and partly in elevation of a heater embodying the present improvements, the same being shown in position within the lower portion of a heating stove and the pipe connection between the discharge nozzle and the tank being partly removed. Fig. 2 is a horizontal section through the mixer of the burner, the spreading box thereof being shown in plan.

Referring to the figures by characters of reference 1 designates a mixing box having an outlet 2 at one end opening into a spreading or fire-box 3 preferably of considerably greater area than the mixing box 1 and having an opening 4 in the top thereof which may if preferred be surrounded by an upstanding flange 5 of asbestos or other like material. This opening is somewhat pear-shaped with its small end adjacent the outlet 2, and arranged within the outlet portion of the mixer 1 is a receptacle 6 which may be filled with asbestos 7.

A nozzle 8 is arranged in the top of the mixing box and has a valve 9 for controlling the passage of fuel therethrough, the lower end of this nozzle projecting into the upper portion of a cone frustum 10, the lower portion of which rests upon the upper end of an inclined spreading plate 11. This plate is substantially fan-shaped and has ribs 12 upstanding therefrom and diverging from the base of the cone-frustum and toward the lower or broad end of the spreading plate, there being retaining flanges 13 along the edges of the plate. A recess 14 is preferably formed in the plate 11 and at the base of the cone frustum 10, this recess opening into the channels formed between the ribs 12. Said recess is located directly under the nozzle 8, so that the fuel dropped from said nozzle will first fall into the recess and will then flow therefrom into the various channels on the spreading plate. As shown in Fig. 1, this plate may be supported upon suitable brackets or standards 15 mounted upon the bottom of the mixing-box, said standards however being so constructed as to permit the circulation of air therethrough. Air inlet openings 16 are formed in the top and back of the mixing box, the air entering them being designed to flow around the cone frustum 10 and under the spreading plate 11. It will be noted that there is a space between the lower edge of the spreading plate and the receptacle 6 through which this air may pass.

A supply tank 17 is designed to be supported in any suitable manner near the point of use, and this tank has a screen or filter 18 therein surrounding an outlet from which extends a supply pipe 19, said pipe opening into the valved nozzle 8 and being provided with a suitable check valve 20 for the purpose of preventing back pressure. The filter 18 may be filled with rock salt and gum camphor or any other suitable material for treating the fuel so as to render it practically non-explosive.

When it is desired to use this burner in connection with a stove such, for example, as indicated at A in Fig. 1, the fire-box 3 is inserted into the base portion of the stove, the mixing box 1 being so proportioned as to completely close the opening into which the burner is inserted. After the tank 17 has been filled with crude oil the valve 9 may be opened and the oil will flow downward through the filter 18 and the pipe 19 to nozzle 8, from which it will be discharged into the cone frustum 10 and the recess 14. The fuel will spread out over the plate 11 and will flow into the receptacle 6. It can here be ignited and will quickly heat the plate 11, so that the fuel as fast as it flows over said plate will be vaporized. Any surplus fuel leaving the plate and entering the receptacle 6 will of course be consumed. Air will enter the mixing box through the openings 16 and will flow under the plate 11 and around it, this air mixing thoroughly with the vapor and forming a combustible mixture. The flames produced in the box 3 will be spread out by the top of said box and be distributed throughout the extent of the opening 4, these flame being directed upwardly through the opening by the draft produced by the air entering the openings 16. Obviously practically complete combustion will be produced by spreading the fuel in the manner described and mixing it with the air.

Although the burner has been shown applied to an ordinary form of heating stove, it is to be understood that the same can, with slight modifications, be used in connection with cooking stoves, and can even be used in open fire-places.

The mixing box and the fire box 3 are preferably formed in one casting and the spreading plate 11, receptacle 6 and cone frustum 10 constitute the only other separate parts of the burner. It will be seen therefore that the burner can be manufactured at comparatively slight cost. The cone frustum 10 of course constitutes a hood for positively directing the fuel into the recess or cup 14 and protecting it from the action of the air current passing through the mixing box.

Obviously various changes may be made in the construction and arrangement of the parts without departing from the spirit or sacrificing the advantages of the invention.

What is claimed is:—

1. A hydro-carbon burner comprising a mixing box having air inlets, a fire box extending therefrom and communicating therewith, said fire box being insertible into a stove casing, there being an opening in the top of the fire box, said top constituting spreading means, an inclined spreading plate supported within the mixing box and having a recess and channels extending from the recess along diverging lines to the lower end of the plate, there being side flanges above the plate, a nozzle projecting into the mixing box and above and in pivotal alinement with the recess, a hollow cone frustum surrounding the nozzle and the recess and having an outlet opening, and a receptacle within the fire box and below the discharge end of the spreading plate, said receptacle having a fibrous, non-inflammable filling.

2. A hydro-carbon burner comprising a mixing box and a fire box opening into each other, said fire box having an opening in the top thereof and an upstanding flange surrounding the same, an inclined spreading plate within and spaced from the mixing box, said plate having a recess in the upper portion thereof and channels extending from the recess to the lower end of the plate and along diverging lines, a nozzle above and in vertical alinement with the recess, a hollow cone frustum surrounding the nozzle and the recess and having a discharge opening, a receptacle upon the bottom of the fire box and below the lower end of the spreading plate, and an asbestos filling within the receptacle, said mixing box having an air inlet.

3. The combination with a stove casing having an opening, of a fire box insertible into the casing and through the opening, said box having an opening in the top thereof and a flange surrounding the opening, a mixing box at one end of the fire box and insertible into and disposed to close the opening in the stove casing, said mixing box having an air inlet, a spreading plate supported within the mixing box and inclined downwardly toward and projecting into the fire box, said spreading plate having a recess in the upper portion thereof and channels extending along diverging lines from the recess to the lower end of the plate, a nozzle for directing fuel into the recess, a hollow cone frustum surrounding the nozzle and recess and having an outlet opening, a receptacle for receiving fuel from the discharge ends of the channels, and a fibrous, non-combustible filling within the receptacle.

4. A hydro-carbon burner comprising a mixing box having air inlets, a fire-box communicating therewith and extending therefrom, said fire-box having an opening in the top thereof, an inclined spreading plate supported within the mixing box and having downwardly diverging ribs thereon forming channels therebetween, there being a recess in the upper portion of said plate and communicating with all of the channels, an overflow receptacle disposed below the lower end of the spreading plate for the reception of liquid fuel, a nozzle, a hood for guarding the fuel during its passage from the nozzle to the recess in the spreading plate, a tank, and a pipe connection between the tank and nozzle.

In testimony that I claim the foregoing as my own, I have hereto affixed my signature in the presence of two witnesses.

ERNEST L. NEWMAN.

Witnesses:
GEO. W. GABRIEL,
H. C. MARKHAM.